United States Patent [19]

White et al.

[11] Patent Number: 5,124,686
[45] Date of Patent: Jun. 23, 1992

[54] TANK LEVEL ALARM CONTROL SYSTEM

[75] Inventors: John J. White, Wilmette, Ill.; Gaston C. Barmore, Jr., Pearland, Tex.

[73] Assignee: Midland Manufacturing Corp., Skokie, Ill.

[21] Appl. No.: 635,969

[22] Filed: Dec. 31, 1990

[51] Int. Cl.⁵ .............................................. G08B 21/00
[52] U.S. Cl. .................................... 340/624; 340/623; 73/308; 73/DIG. 5; 200/84 C
[58] Field of Search .................. 340/624, 623; 73/306, 73/308, 313, 322, DIG. 5; 200/84 C

[56] References Cited

U.S. PATENT DOCUMENTS

| | | | |
|---|---|---|---|
| 1,348,015 | 7/1920 | Lee | 340/624 |
| 2,671,834 | 3/1954 | Kmiecik | 200/84 C |
| 2,820,865 | 1/1958 | McKinnies | 200/84 C X |
| 4,924,703 | 5/1990 | White et al. | 340/624 X |

Primary Examiner—Jin F. Ng
Assistant Examiner—Jeffery A. Hofsass
Attorney, Agent, or Firm—Emrich & Dithmar

[57] ABSTRACT

The gauge has an outer tube sealed at its lower end and adapted for attachment to the top wall of the tank, and an inner tube axially movable within the outer tube. A float encircles the outer tube and moves freely therealong. First and second magnets respectively attached to the float and to the lower end of the inner tube provide magnetic coupling therebetween so that a rising liquid causes the inner tube to rise with the float. Magnets within the inner tube operate a switch to signal when the first and second magnets are in position for magnetic coupling therebetween. Another magnet is fixed by a set screw to the outside of the inner tube in position for operating the switch when the tank is substantially full. Retaining clips are also disclosed for holding the latter magnet in place.

16 Claims, 2 Drawing Sheets

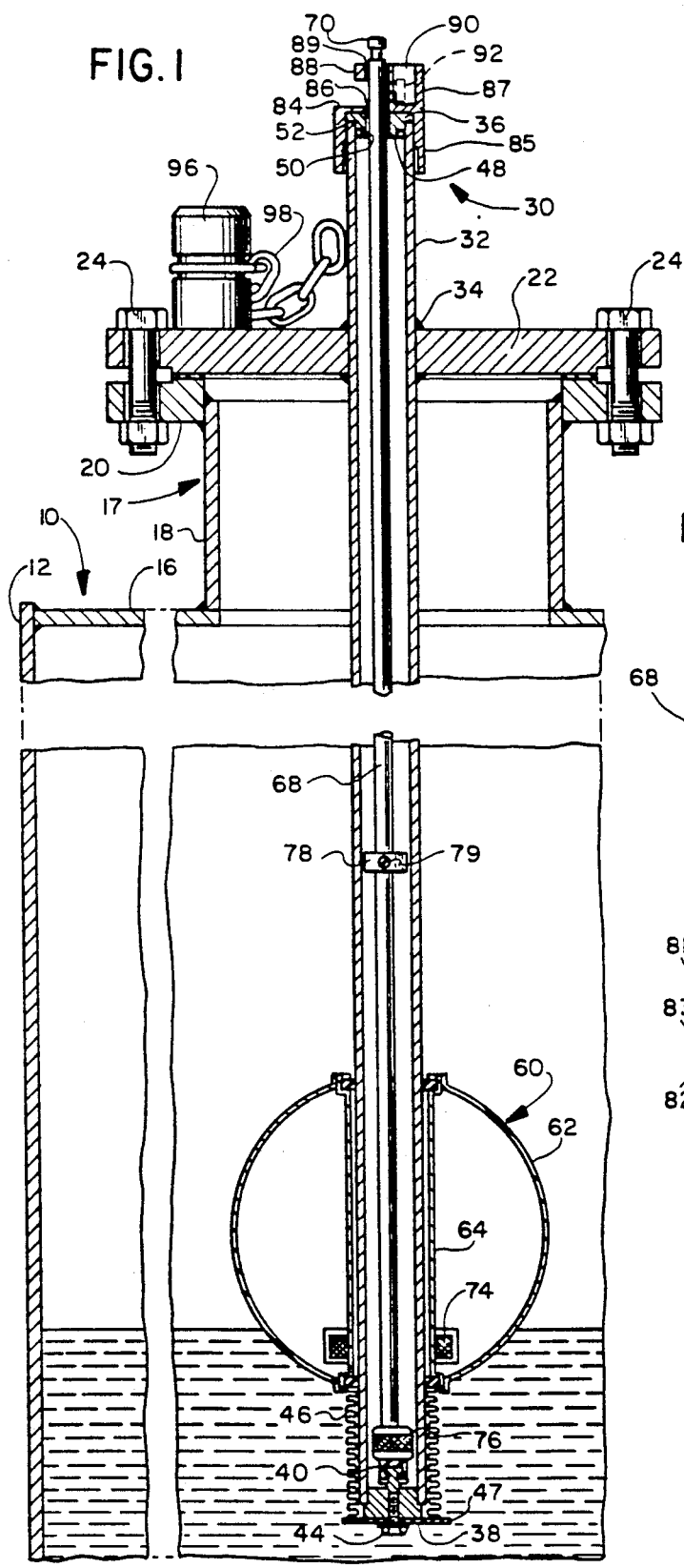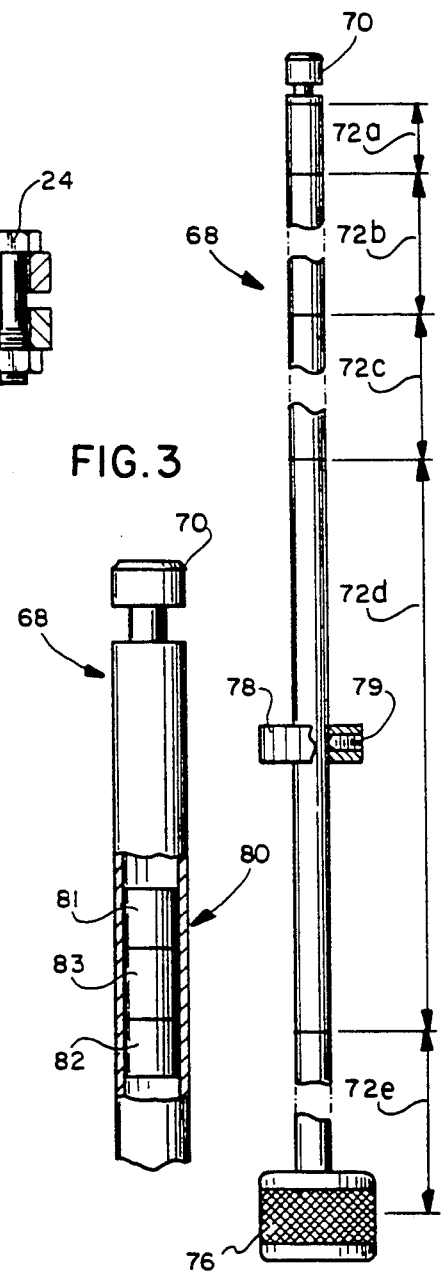

TANK LEVEL ALARM CONTROL SYSTEM

BACKGROUND OF THE INVENTION

1. Field of the Invention

The present invention relates to gauge systems for indicating the level of liquid in a tank and providing an alarm signal when a predetermined level has been reached.

2. Description of the Prior Art

U.S. Pat. No. 4,924,703, assigned to the assignee of this invention, discloses a prior art apparatus for indicating the level of liquid in a tank. The patented apparatus comprises a float encircling a guide tube extending down into the tank. The float is magnetically coupled to a gauging tube. As the liquid level rises, the float carries the gauging tube upwardly. The patented apparatus also has a mechanism for automatically visually and audibly alerting the tankerman when the level has reached a particular level, such as near full. This mechanism includes a reed switch mounted on the tank above the upper end of the guide tube and a level alarm magnet disposed within the gauging tube. The level alarm magnet comes into close proximity to the reed switch to actuate it as the tank is becoming filled.

While this system performs quite well, it does not adapt conveniently to different types of liquid ladings. More specifically, some tanks are used to carry a variety of products with varying densities and, in each such different liquid product, the float will submerge to a different level. Therefore, the liquid level at which the switch will be triggered will vary, since the triggering alarm magnet is at a fixed position in the gauging tube. Thus, to ensure accurate level indications for all liquids, there must be provided for each different liquid a different gauging tube with its alarm magnet fixed at a different position tailored for the particular liquid. This is inconvenient and expensive.

In the barge tank embodiment disclosed in the aforementioned patent, the magnetic coupling between the float and the gauging tube is provided by magnets carried by those parts in such position that they are magnetically coupled when the float and the gauging tube are both disposed in their lowermost positions. But in other applications, such as in railway tank cars, it is desirable to have the gauging tube coupling magnet disposed well below the float magnet when the two parts are both disposed in their lowermost positions, so that there is no magnetic coupling therebetween. Thus, the tankerman cannot be sure when the gauging tube and the float are magnetically coupled so as to know when to begin filling the tank.

SUMMARY OF THE INVENTION

It is a general object of the invention to provide an improved tank level gauge and alarm control system therefor which avoids the disadvantages of prior systems while affording additional operating and structural advantages.

An important feature of the invention is the provision of a tank level gauge which readily adapts to different-density liquid ladings.

In connection with the foregoing feature, another feature of the invention is the provision of a gauge of the type set forth which includes a level indicating alarm magnet which can readily be repositioned along the gauging Another feature of the invention is the provision of a gauge of the type set forth which provides a positive indication when the float and the gauging tube are magnetically coupled.

Certain of these features are attained by providing, in a gauge for indicating the level of liquid in a tank, including an outer tube having a lower end for extending into the tank and an upper end for protruding from the tank, a float encircling the outer tube and movable therealong as the liquid level in the tank rises and falls, an inner tube disposed within the outer tube and axially movable therein, first magnet means attached to the inner tube adjacent to the lower end thereof, second magnet means in the float and adapted to magnetically couple to the first magnet means so that a rising liquid level in the tank causes the inner tube to rise, and magnetically operable switch means laterally adjacent to the inner tube near the upper end of the outer tube, the improvement comprising: third magnet means, and means removably mounting the third magnet means on the outside of the inner tube in a position for magnetically operating the switch means when proximate thereto.

Others of these features are attained by providing, in a gauge for indicating the level of liquid in a tank, including an outer tube having a lower end for extending into the tank and an upper end for protruding from the tank, a float encircling the outer tube and movable therealong as the liquid level in the tank rises and falls, an inner tube disposed within the outer tube and axially movable therein, first magnet means attached to the inner tube adjacent to the lower end thereof, and second magnet means in the float and adapted to magnetically couple to the first magnet means so that a rising liquid level in the tank causes the inner tube to rise, the improvement comprsing: stop means limiting the downward movements of the float and the inner tube so that in their lowermost positions the first magnet means is disposed a predetermined distance below the second magnet means sufficient to prevent magnetic coupling therebetween, and indicator means responsive to upward movement of the inner tube for providing an indication when the inner tube has been raised sufficiently to provide magnetic coupling between the first and second magnet means.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a fragmentary view in vertical section of a portion of a tank in which is mounted a tank-level gauge constructed in accordance with the features of the present invention, illustrating the gauge in its position when the tank is nearly empty;

FIG. 2 is an enlarged, fragmentary, elevational view of the inner gauging tube which forms a part of the tank level gauge of FIG. 1;

FIG. 3 is a further enlarged, fragmentary view in partial section of the upper end of the gauging tube of FIG. 2;

DESCRIPTION OF THE PREFERRED EMBODIMENT

Figure 4:
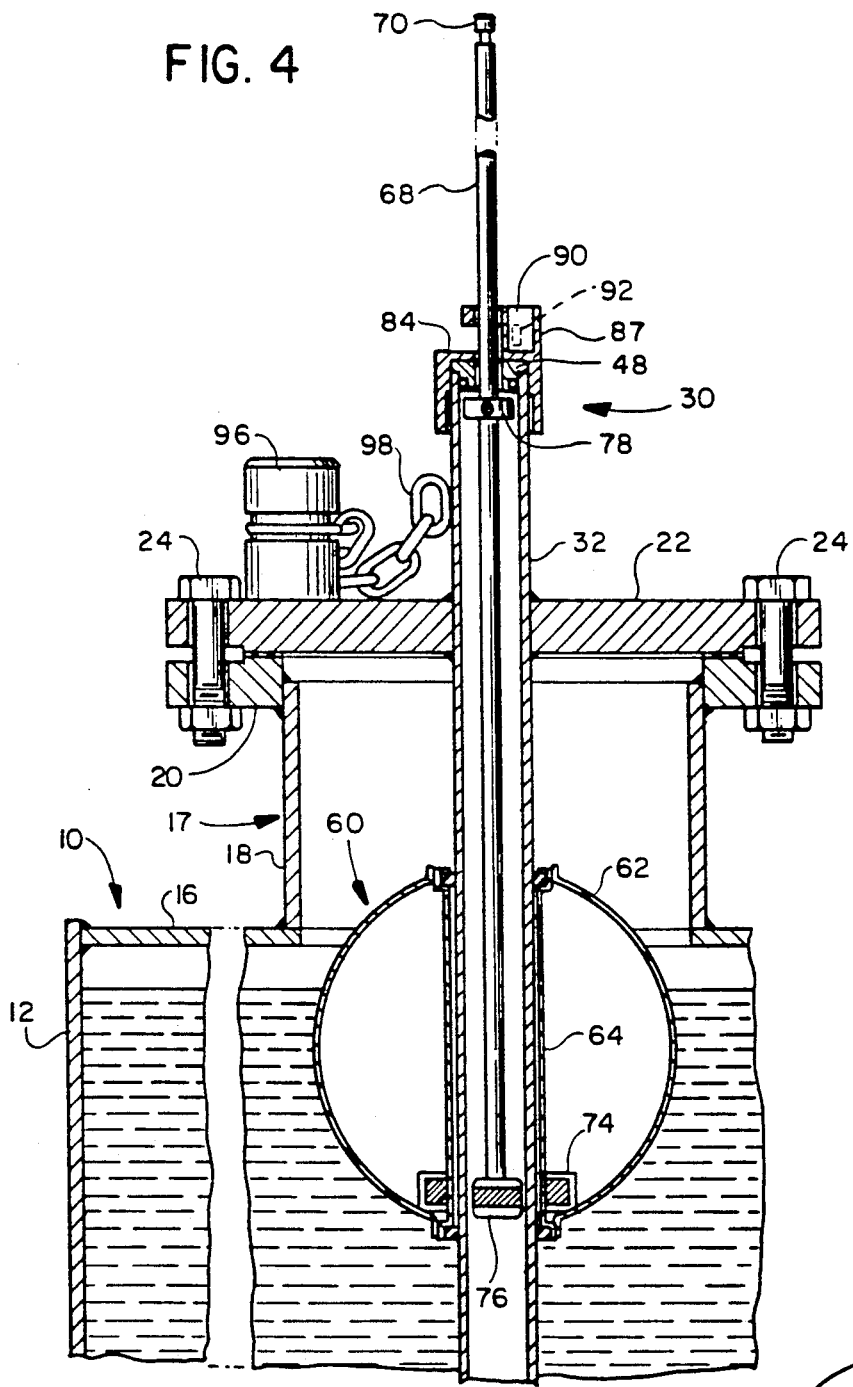
FIG. 4 is a view similar to FIG. 1, illustrating the gauge in its when the tank is full.

Turning now to the drawings, and more particularly to FIG. 1 thereof, there is depicted a tank 10. Although the invention has use in providing information on the level of liquid in any kind of tank, it has particular use in barge tanks, which may be from ten to thirty feet in height and thirty or more feet in length and/or width, and in railway tank cars. The tank 10 is a generalized tank for purposes of illustration, and it will be appreciated that actual barge or railway tanks may differ in specific structural details. The tank 10 has side walls 12, a bottom wall (not shown) and a top wall 16. The top wall 16 has an opening therein with which a nozzle 17 is aligned. The nozzle 17 extends upwardly from the top wall 16 and includes a cylinder 18 welded thereto. A ring-shaped flange 20 is welded to the top of the cylinder 18 and a mounting plate 22 is attached to such flange by bolts 24 (only two of which are shown).

At the dock or railway siding, the level of liquid in the tank 10 may be determined and, for that purpose, there is provided a gauge 30 incorporating the features of the present invention. The gauge 30 comprises an outer guide tube 32 which preferably is composed of corrosion-resistant, non-magnetic material in order to withstand corrosive liquids which may be stored in the tank 10. Stainless steel in the 300 series may be utilized. The tube 32 extends through an opening in the plate 22 and is attached thereto, as by weldments 34. The tube 32 has an upper end 36 which is externally threaded. A sealing plug 38 is seal welded on the lower end of the outer tube 32 and carries a rubber bumper 40. A washer 42 is attached to the bottom of the plug 38 by means of a bolt 44. The outer diameter of the washer 42 is greater than the outer diameter of the outer tube 32, thereby defining a ledge upon which rests a helical spring defining a cushion 46.

A bushing 48 is disposed in the upper end 36 of the outer tube 32 and has a bore 50 extending therethrough. The bushing 48 has a circumferential outer groove within which resides an 0-ring 52 to seal the bushing 48 to the inside of the inner tube 32.

The gauge 30 includes a float 60 having a hollow spherical shell 62 and a tube 64 hermetically attached together. The tube 32 passes through the tube 64 so that the float 60 can freely move vertically along the tube 32 with change in liquid level. The float 60 is also preferably made of corrosion-resistant, non-magnetic material.

The gauge 30 further includes an inner gauging tube 68 which resides in the outer tube 32 and is axially movable therein. The tube 68 is preferably made of corrosion-resistant, non-magnetic material, such as aluminum or fiberglass. The inner tube 68 extends through the bore 50 in the bushing 48 and the hole 56 in the bracket holder 54. In the upper end of the inner tube 68 is a tip 70 which protrudes upwardly therefrom.

Within the float 60 is mounted a ring-shaped magnet 74 which is attached to the inside wall of the shell 62 and encircles the tube 64. Thus, as the float 60 rises, the magnet 74 carried thereby also rises. A generally cylindrical magnet 76, having a height generally corresponding to that of the magnet 74, is secured to the lower end of the inner tube 68 and rests on the bumper 40 when the inner tube 68 is in its lowermost position. When the magnet 76 is level with the magnet 74 the inner tube 68 will be magnetically coupled to the float 60 and will rise therewith as the liquid level rises.

Referring also to FIG. 2, the exterior of the inner tube 68 may bear numbers representing liquid height and also may be divided into five different zones, including zones 72a-d, respectively colored according to a standard scheme, namely orange, green, yellow and red. A fifth zone 72e may be uncolored. The tube 68 may bear a transparent plastic sleeve to protect the numbers and colors. In an actual barge tank embodiment of the invention, the zone 72a was 1" in length, the zones 72b and 72c were 17.25" and the zone 72d was 8" in length. The distance from the bottom of the zone 72d to the magnet 76 was 15.5". These colored indicia and numbers appear as the tube 68 rises through the bushing 48.

As is illustrated in FIG. 1, when the float 60 and the inner tube 68 are both disposed in their lowermost positions, respectively resting on the cushion 46 and the bumper 40, the magnet 76 is spaced well below the magnet 74 a distance sufficient to prevent magnetic coupling therebetween. This is an arrangement which is found in railway tank car applications. However, it will be understood, that in other applications, such as barge tanks of the type disclosed in the aforementioned U.S. Pat. No. 4,924,703, the parts may be so arranged that when the float 60 and the inner tube 68 are both disposed in their lowermost positions the magnets 74 and 76 will be at the same level so as to provide magnetic coupling therebetween.

There is also provided a level indicating alarm magnet 78 which is in the form of an annular ring magnet which encircles the inner tube 68, being fixedly secured thereto by means of a set screw 79 which is threadedly engaged in a complementary radial bore in the magnet 78 and is engageable with the outer surface of the inner tube 68. It will be appreciated that the set screw 79 permits location of the magnet 78 at any desired position along the length of the inner tube 68. The magnet 78 is located nearer the bottom of the inner tube 68 than the top, e.g., near the top of the zone 72d.

The gauge 30 also includes a control magnet assembly 80 which comprises a pair of magnets 81 and 82 disposed within the inner tube 68 near the upper end thereof and spaced apart by a spacer 83, the magnets 81 and 82 and the spacer 83 all being frictionally held in place within the inner tube 68. Preferably, the control magnet assembly 80 is positioned within the inner tube 68 so that, when the inner tube 68 is disposed in its lowermost position, illustrated in FIG. 1, the upper magnet 81 will be disposed below the switch 92 a distance substantially equal to the vertical distance between the magnets 74 and 76. Thus, when the magnet 76 is raised to a point level with the magnet 74 to provide magnetic coupling therebetween, the upper magnet 81 will be disposed adjacent the switch 92 for actuation thereof.

The gauge 30 further includes an inverted cup-shaped housing 85 which is fitted over the upper end of the guide tube 32. The housing 85 has an end wall 84, with a central hole 86 therein. A receptacle 87 projects upwardly from the end wall 84 to one side of the hole 86. A flange 88 projects laterally from the upper end of the receptacle 87 and has a guide hole 89 therein aligned with the hole 86 for receiving the gauging tube 68 therethrough. Disposed within the receptacle 87 is a control circuit board 90 having visual and/or audible annunciators (not shown) to create alerting flashes and tones. It is understood that the depicted construction of the receptacle 85 is exemplary. Other ways to mount the circuit board 90 would be equally acceptable. The circuit board 90 contains a magnetically operable switch, such as a reed switch 92, located laterally adjacent to the upper end of the inner tube 68 when it is in its lowermost position. The circuit board 90 also contains circuitry (not shown) coupling the reed switch 92 to the annunciators contained on the circuit board 90. The magnet 78 is preferably positioned on the inner tube 68 so that it will be disposed near the reed switch 92, just below the bushing 48, just before the red zone 72d is visible. Alternately, the circuit board 90 may mount just the reed switch 92, which is electrically connected to another circuit, remotely located, containing, for example, relays, annunciators, etc. Preferably, the reed switch 92 is a toggle-type switch having two conditions, so that each time it is operated it will reverse conditions.

When the tank 10 is empty, or at least at the level depicted in FIG. 1 or below, the float 60 is located at the bottom of the outer tube 32 and rests upon the cushion 46. The inner tube 68 rests on the bumper 40 and the tip 70 of the inner tube 68 is visible to the tankerman. In this condition, the float 60 is decoupled from the inner tube 68, as was explained above. The tank 10 must not be filled with the gauge 30 in this condition, since the inner tube 68 will not move in response to the rising of the float 60 and the tankerman will receive no indication when the tank is full. Accordingly, the circuitry of the circuit board 90 may be such that, when it is initially activated or turned on it will give an indication to the tankerman, such as by a flashing light, to indicate that there is no magnetic coupling between the float 60 and the inner tube 68. Thus, the tankerman would manually raise the inner tube 68 by grasping the tip 70 thereof. When the inner tube 68 has been raised sufficiently to establish magnetic coupling between the magnets 74 and 76, the upper magnet 81 of the control magnet assembly 80 will actuate the switch 92 to extinguish the flashing light or other signal to indicate to the tankerman that the magnetic coupling has been established. He can then release the inner tube 68 and begin filling the tank.

As the liquid in the tank 10 rises, the float 60 also rises carrying the magnet 74 mounted therein upwardly. The inner tube 68 also rises because of the magnetic coupling between the two magnets 74 and 76. Initially, the zone 72a, typically orange, will be visible to the tankerman. As the liquid level rises, the zone 72b, typically green, will become visible. As the inner tube 68 begins to rise the second magnet 82 of the control magnet 80 will pass the switch 92 and toggle it back to its original condition. The circuitry of the control box 90 may be such that this toggling of the switch 92 will "arm" the circuitry to place it in condition for responding to the level indicating alarm magnet 78. As the level continues to rise, the level 72c, typically yellow, and then the level 72d, typically red, will become visible. At about the time the level 72d is about to become visible the magnet 78 will reach the bushing 48, at which position it will be sufficiently close to the reed switch 92 to operate it, thereby setting off the visual and/or audible annunciators, informing the tankerman that the tank is full or near full. This condition is depicted in FIG. 4. If the level continues to rise, the zone 72d, typically red, becomes visible, signifying danger. Then, the float 60 will be near its highest position and the tank nearly full.

After the tank filling operation is completed, the inner tube 68 can be moved out of the way by simply pressing on the tip 70 to cause decoupling of the magnets 74 and 76. The inner tube 68 will drop to its stored position on the bumper 40, but it is so dimensioned that a short section (for example one inch in length) will still protrude at the upper end of the outer tube 32.

Measurements of the level of liquid in the tank are made infrequently. Therefore, referring to FIG. 1, a protective cap 96 is provided to close the outer tube 32. The cap is tethered by a chain 98. When the tank 10 is not being gauged, bracket holder 54 may be replaced by the cap 96, thereby closing the outer tube 32.

Figure 5:
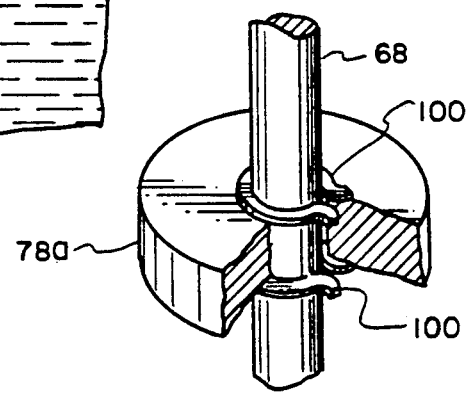
FIG. 5 is a fragmentary perspective view illustrating an alternative mounting for the level alarm magnet of FIG. 2.

Referring now to FIG. 5, there is illustrated an alternative form of the level indicating alarm magnet, designated by the numeral 78a. In this embodiment, the magnet 78a is an annular magnet which slips over the end of the inner tube 68. The magnet 78a is retained in place at the desired location by a pair of retainer clips 100 in the form of flexible, resilient split rings which are snapfitted around the inner tube 68 immediately above and below the magnet 78a. The clips 100 have outer diameters greater than the inner diameter of the magnet 78a so as to prevent movement of the magnet 78a longitudinally of the inner tube 68.

From the foregoing, it can be seen that there has been described an improved gauge which enables the tankerman to positively determine when magnetic coupling has been established between the float and the inner tube, and further enables the tankerman to monitor the level of liquid in the tank and alerts him when the tank is nearly filled. The gauge system is readily adaptable to different liquid ladings having different densities.

We claim:

1. In a gauge for indicating the level of liquid in a tank, including an outer tube having a lower end for extending into the tank and an upper end for protruding from the tank, a float encircling the outer tube and movable therealong as the liquid level in the tank rises and falls, an inner tube disposed within the outer tube and axially movable therein, first magnet means attached to the inner tube adjacent to the lower end t hereof, second magnet means in the float and adapted to magnetically couple to the first magnet means so that a rising liquid level in the tank causes the inner tube to rise, and magnetically operable switch means laterally adjacent to the inner tube near the upper end of the outer tube, the improvement comprising: third magnet means, means removably mounting said third magnetic means on the outside of the inner tube intermediate the ends thereof in a position for magnetically operating the switch means when proximate thereto, and bushing means closing the outer tube at the upper end thereof and having a bore therein for receiving the inner tube therethrough, said third magnet means being engageable with said bushing for limiting the upward movement of the inner tube, said bushing being spaced below the switch means a distance such that said third magnet means is capable of operating the switch means when disposed at said bushing.

2. In a gauge for indicating the level of liquid in a tank, including an outer tube having a lower end for extending into the tank and an upper end for protruding from the tank, a float encircling the outer tube and movable therealong as the liquid level in the tank rises and falls, an inner tube disposed within the outer tube and axially movable therein, first magnet means attached to the inner tube adjacent to the lower end thereof, and second magnet means in the float and adapted to magnetically couple to the first magnet means so that a rising liquid level in the tank causes the inner tube to rise, the improvement comprising: stop means limiting the downward movements of the float and the inner tube so that in their lowermost positions the first magnet means is disposed a predetermined distance below the second magnet means sufficient to prevent magnetic coupling therebetween, and indicator means responsive to upward movement of the inner tube for providing an indication when the inner tube has been raised sufficiently to provide magnetic coupling between the first and second magnet means.

3. The gauge of claim 2, wherein said indicator means includes means carried by the inner tube and movable therewith.

4. The gauge of claim 2, wherein said indicator means includes switch means laterally adjacent to the inner tube near the upper end of the outer tube, and switch actuating means carried by the inner tube and movable therewith.

5. The gauge of claim 4, wherein said switch means is magnetically operable switch means, said actuating means including coupling indicating magnet means carried by the inner tube.

6. The gauge of claim 5, wherein said coupling indicating magnet means includes two magnets carried by the inner tube and spaced apart a predetermined distance therealong.

7. The gauge of claim 6, and further comprising level indicating magnet means carried by the inner tube below the coupling indicating magnet means in a position for magnetically operating the switch means when proximate thereto.

8. The gauge of claim 2, wherein said indicator means includes level indicating alarm means for producing an indication when the tank has been filled to a predetermined level.

9. In a gauge for indicating the level of liquid in a tank, including an outer tube having a lower end for extending into the tank and an upper end for protruding from the tank, a float encircling the outer tube and movable therealong as the liquid level in the tank rises and falls, an inner tube disposed within the outer tube and axially movable therein, first magnet means attached to the inner tube adjacent to the lower end thereof, second magnet means in the float and adapted to magnetically couple to the first magnet means so that a rising liquid level in the tank causes the inner tube to rise, and magnetically operable switch means laterally adjacent to the inner tube near the upper end of the outer tube, the improvement comprising: stop means limiting the downward movements of the float and the inner tube so that in their lowermost positions the first magnet means is disposed a predetermined distance below the second magnet means sufficient to prevent magnetic coupling therebetween, third magnet means carried by the inner tube above the first magnet means in a position for magnetically operating the switch means when proximate thereto, and fourth magnet means carried by the inner tube above the third magnet means in a position for magnetically operating the switch means when proximate thereto.

10. The gauge of claim 9, wherein said third magnet means is mounted on the outside of the inner tube.

11. The gauge of claim 10, and further comprising means removably mounting said third magnet means on the inner tube.

12. The gauge of claim 9, wherein said fourth magnet means is disposed along the inner tube in a position for providing an indication when the inner tube has been raised sufficiently to provide magnetic coupling between the first and second magnet means.

13. The gauge of claim 12, wherein said fourth magnet means is disposed inside the inner tube.

14. The gauge of claim 13, wherein said fourth magnet means includes two magnets.

15. The gauge of claim 14, wherein said fourth magnet means includes non-magnetic spacer means disposed between said two magnets of said fourth magnet means.

16. In a gauge for indicating the level of liquid in a tank, including an outer tube having a lower end for extending into the tank and an upper end for protruding from the tank, a float encircling the outer tube and movable therealong as the liquid level in t he tank rises and falls, an inner tube disposed within the outer tube and axially movable therein, first magnet means attached to the inner tube, and second magnet means in the float and adapted to magnetically couple to the first magnet means so that a rising liquid level in the tank causes the inner tube to rise, the improvement comprising: stop means limiting the downward movements of the float and the inner tube so that in their lowermost positions the first magnet means is spaced a predetermined distance vertically from the second magnet means sufficient to prevent magnetic coupling therebetween, and indicator means responsive to upward movement of the lowermost one of the float and the inner tube for providing an indication when said lowermost one has been raised sufficiently to provide magnetic coupling between the first and second magnet means.

* * * * *